United States Patent
Jaggers et al.

(10) Patent No.: US 6,259,601 B1
(45) Date of Patent: Jul. 10, 2001

(54) APPARATUS FOR PROVIDING DOCKING STATION ASSISTED COOLING OF A PORTABLE COMPUTER

(75) Inventors: Christopher Michael Jaggers, Austin; Cassius Joseph Mullen, Round Rock; David William Grunow, Austin, all of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/409,581

(22) Filed: Sep. 30, 1999

(51) Int. Cl.[7] .................................................... H05K 7/20
(52) U.S. Cl. ...................... 361/690; 361/687; 361/692; 361/695; 165/121; 165/122; 165/104.33; 174/15.1; 454/184
(58) Field of Search ................................ 361/687–395, 361/696–697, 700, 703, 709, 683, 699, 710; 165/58, 185, 104.33, 104.32, 104.34, 86, 121, 122; 174/15.1, 52.4, 15.2, 252; 395/281–283, 750.08, 700, 750.01, 750.06, 200; 454/184; 108/108; 211/153, 90, 184

(56) References Cited

U.S. PATENT DOCUMENTS

| | | |
|---|---|---|
| 5,119,270 | 6/1992 | Bolton . |
| 5,456,632 * | 10/1995 | Ohtsu et al. ........................ 454/184 |
| 5,664,118 * | 9/1997 | Nishgaki et al. ..................... 395/750 |
| 5,694,292 * | 12/1997 | Paulsel et al. ....................... 361/686 |
| 5,757,615 | 5/1998 | Donahoe . |
| 5,768,101 | 6/1998 | Cheng . |
| 5,884,049 | 3/1999 | Atkinson . |
| 5,959,836 * | 9/1999 | Bhatia ................................. 361/687 |
| 5,974,556 * | 10/1999 | Jackson et al. ...................... 713/322 |
| 6,094,347 * | 7/2000 | Bhatia ................................. 361/695 |

FOREIGN PATENT DOCUMENTS

411238984A * 8/1999 (JP) ................................ H05K/7/20

* cited by examiner

*Primary Examiner*—Leo P. Picard
*Assistant Examiner*—Michael Datskovsky
(74) *Attorney, Agent, or Firm*—Haynes and Boone, LLP

(57) ABSTRACT

A docking device for a portable computer including an enclosure having a support surface for supporting a portable computer thereon. An orifice plate is attached to the enclosure adjacent to the support surface. The orifice plate includes a plurality of orifices formed therethrough and the orifice plate is recessed with respect to the support surface. An air duct including an outlet portion is attached to an interior portion of the enclosure adjacent to the orifice plate. A blower is attached to an inlet portion of the air duct. The blower is operable to pressurize the air duct such that air is expelled through the orifices. The embodiments of the present disclosure reduce the skin temperature of the computer and the operating temperature of heat generating internal components. In addition, the processor can be operated at higher speeds for longer periods of time.

26 Claims, 4 Drawing Sheets

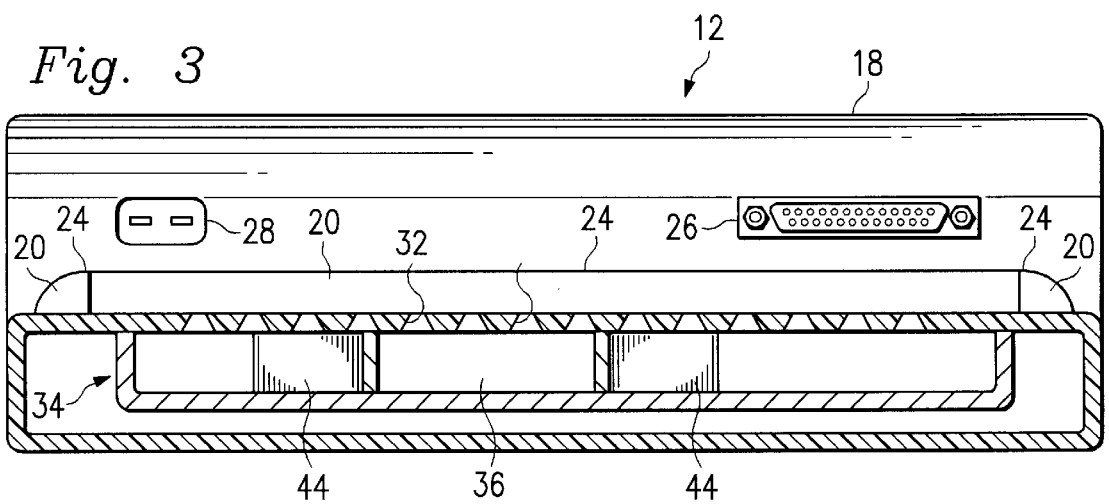
*Fig. 3*
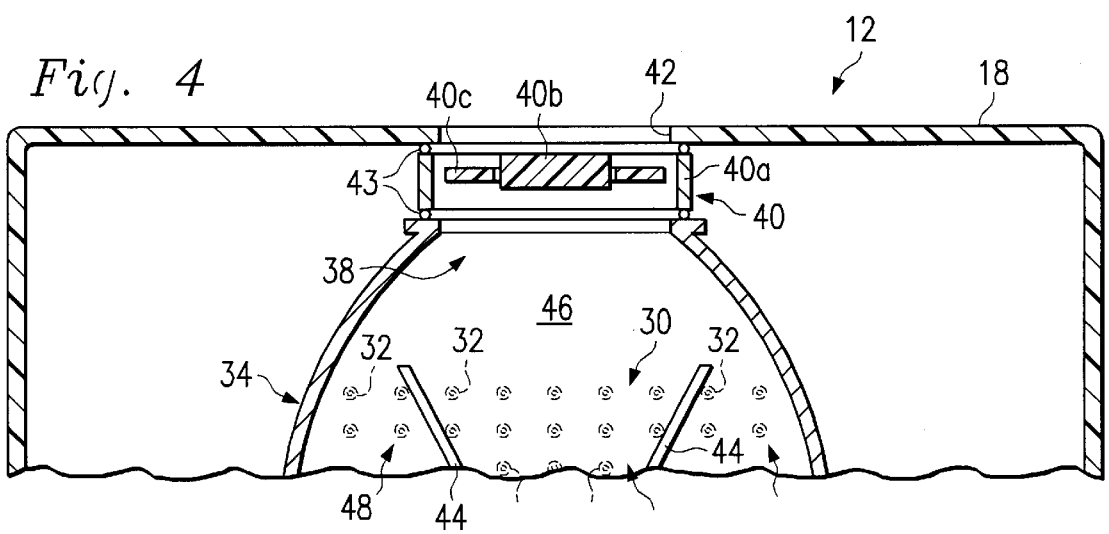
*Fig. 4*
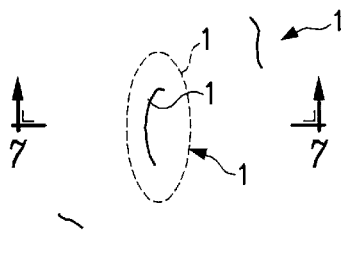
*Fig. 6*
*Fig. 7*
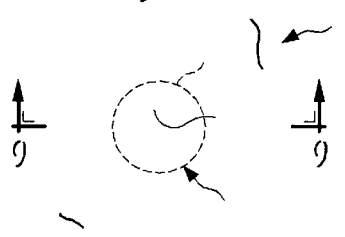
*Fig. 8*
*Fig. 9*

APPARATUS FOR PROVIDING DOCKING STATION ASSISTED COOLING OF A PORTABLE COMPUTER

BACKGROUND

The disclosures herein relate generally to computer systems and more particularly to an apparatus for providing docking station assisted cooling of a portable computer.

With the increased performance capabilities of portable computers, they are becoming more popular for use in an undocked mode as well as in a docked mode in which they are engaged with a docking device such as a port replicator, a docking station or other type of similar device. While docked, a portable computer is typically positioned under a monitor stand with its display in the closed position. This orientation decreases the ability of the portable computer to passively shed heat, resulting in increased temperatures. Accordingly, it becomes essential to use alternate techniques to dissipate the heat generated by the components within the computer during operation in a docked mode.

Dissipation of the heat is necessary to insure that the temperature of certain components remains within their allowable operating temperature. This is especially true with respect to heat generating components such as the processor, video controller and memory. These components could fail prematurely or malfunction if they exceed their allowable operating temperature.

Some docking apparatus includes a cooling apparatus that draws air along the surfaces of the portable computer. This method uses forced convection to improve the thermal dissipation by reducing the skin temperatures and internal temperatures. However, due to flow conditions such as laminar boundary layers, the effectiveness of these types of cooling systems is limited.

U.S. Pat. No. 5,768,101 discloses a docking base for a portable computer. The base includes a hollow housing with a generally horizontal support portion for supporting the portable computer thereon and a generally upright portion disposed on a rear end of the support portion. The upright portion of the housing includes a front wall that is formed with a vent hole to be juxtaposed with a heat-dissipating fan unit on the rear side of the portable computer so that hot air from the fan unit can enter into the housing. The upright portion is further formed with an exhaust hole to prevent the hot air from being trapped in the housing. A conduit unit is mounted in the upright portion of the housing. The conduit unit has an inlet end adjacent to the vent hole and an outlet end adjacent the exhaust hole. The conduit unit guides the hot air that enters the vent hole out of the housing via the exhaust hole.

U.S. Pat. No. 5,694,292 discloses a docking station that has a removable guide and support shelf along which a portable computer may be slid into operatively coupled engagement with the docking station. When docked, the computer rests atop three mutually spaced vertical projections formed on the top side of a base wall portion of the shelf. This forms a cooling air passageway between the bottom of the computer and the top side of the shelf. A fan in the docking station draws ambient air through this passageway and then flows the air downwardly through cooling slots in the shelf before exhausting the air back to ambient. The fan also draws ambient cooling air downwardly through a gap between the rear side of the docked computer and a facing connection area of the docking station.

U.S. Pat. No. 5,757,615 discloses a notebook computer that has a base housing in which a heat-generating component is located. A lid housing is pivotally secured to the base housing for pivotal movement relative thereto between open and closed positions. A relatively thin, hollow, flexible heat exchanger has a first section positioned in the base housing in heat exchange contact with the heat-generating component, a second section disposed in the lid housing in heat exchange contact therewith, and a flexible third section through which the interiors of the first and second sections are communicated. During operation of the computer, a small motor-driven pump re-circulates a cooling liquid through the heat exchanger in a manner causing heat from the heat-generating component to be transferred to liquid in the first heat exchanger section, be carried therewith through the third section into the second section, and be transferred via the second section to the lid housing portion for dissipation therefrom to ambient. In an alternate embodiment of the computer, heat from the third heat exchanger section is transferred to an exposed metal heat exchanger block in the computer to permit heat dissipation from the closed computer when it is operatively inserted into a docking station.

Faster processors and increases in the density of electronics inside notebook computers are constantly pushing the limits of portable computer cooling systems and components. Excessive internal temperatures can adversely affect processor performance. However, when the processor becomes too hot, most processors are programmed to throttle their operating speed to limit heat creation and reduce the potential for thermal destruction.

Thermal solutions for portable computers are constrained by size, cost and power consumption. As the thermal demands increase, it becomes increasingly difficult to actively dissipate the heat through the thermal solution. As a result, a large portion of the heat is dissipated passively through the outside surface (skin) of the notebook. The resulting high skin temperatures are undesirable for the comfort of the user.

Accordingly, there is a need for an apparatus to assist in the cooling of a docked portable computer that overcomes the shortcomings associated with previous dock assisted cooling techniques.

SUMMARY

One embodiment, accordingly, provides an apparatus that impinges air against the enclosure of a docked portable computer. To this end, one embodiment provides a cooling apparatus for a computer docking device including an orifice plate connected to the docking device and having a plurality of orifices formed therethrough. The apparatus is provided with a support for supporting a portable computer at an offset distance with respect to a first side of the orifice plate. An air duct including an inlet portion and an outlet portion is positioned adjacent to a second side of the orifice plate. A blower is attached to the inlet portion of the air duct with the blower being operable to pressurize the air duct such that air is expelled from the outlet portion of the air duct through the orifices.

A principal advantage of this embodiment is that the skin temperature of the computer and the operating temperature of heat generating internal components are reduced.

BRIEF DESCRIPTION OF THE DRAWING FIGURES

FIG. 3 is a cross sectional view taken along the line 3—3 in FIG. 2.

FIG. 4 is a fragmentary cross sectional view taken along the line 4—4 in FIG. 2.

FIG. 6 is a fragmentary top view illustrating an embodiment of a non-circular orifice.

FIG. 7 is a cross sectional view taken along the line 7—7 in FIG. 6.

FIG. 8 is a fragmentary top view illustrating an embodiment of a circular orifice.

FIG. 9 is a cross sectional view taken along the line 9—9 in FIG. 8.

DETAILED DESCRIPTION

Figure 1:
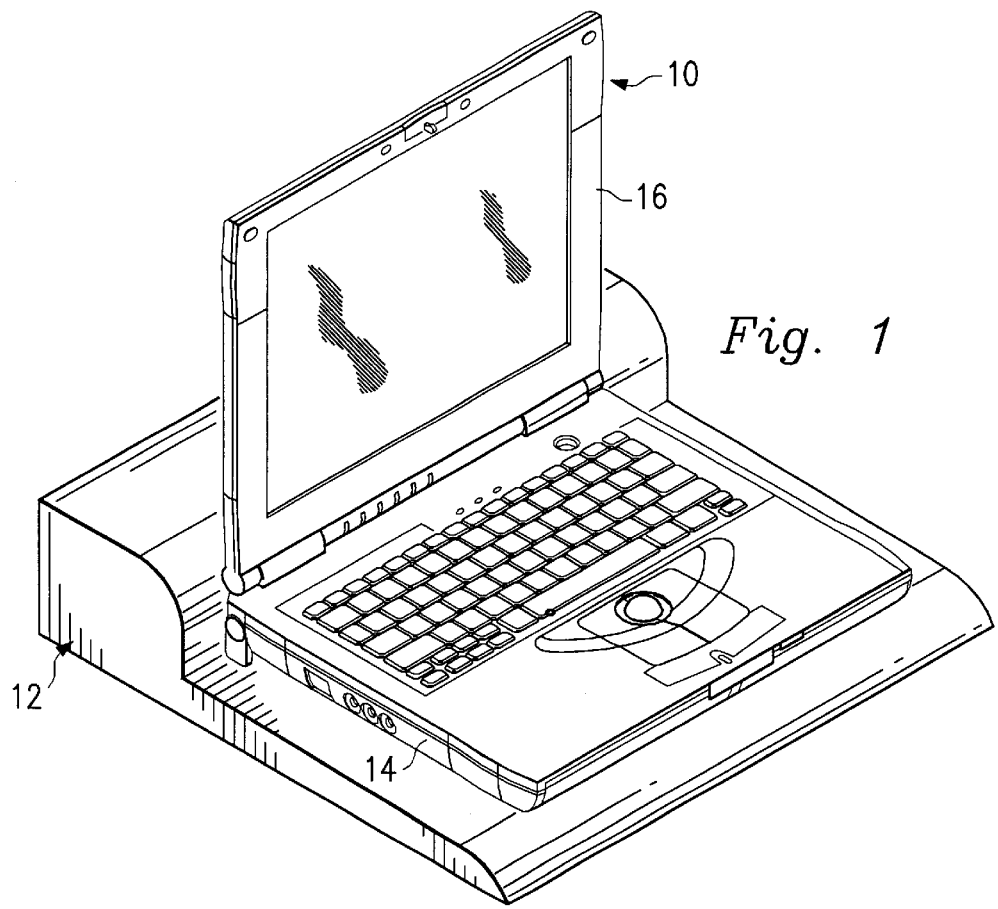
FIG. 1 is a perspective view illustrating an embodiment of a docking station with a portable computer mounted thereon.

An embodiment of a portable computer 10 engaged with a docking apparatus 12 is illustrated in FIG. 1. The portable computer 10 includes a base portion 14 and a top portion 16. The base portion 14 is supported by the docking apparatus 12.

Figure 2:
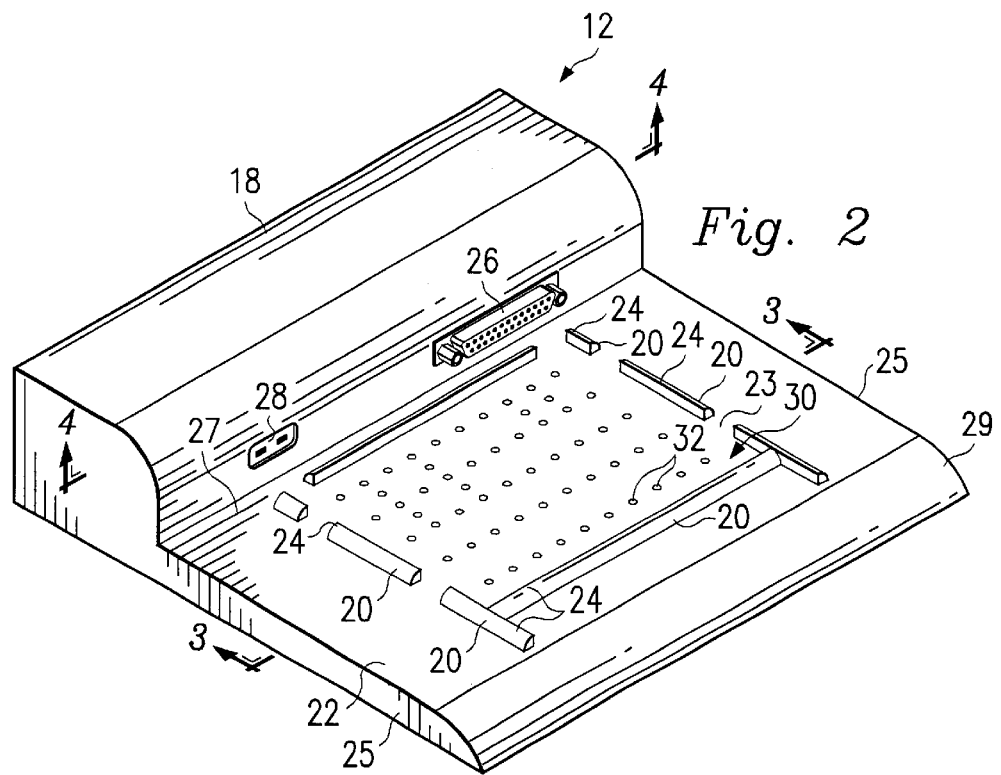
FIG. 2 is a perspective view illustrating an embodiment of the docking station.

The docking apparatus 12 includes an enclosure 18, FIG. 2. A plurality of support members 20 are attached to a top surface 22 of the enclosure 18. The support members 20 are spaced apart to define an opening 23 between adjacent support members 20. The support members 20 include a support surface 24 which supports the portable computer 10. A signal connector 26 and a power connector 28 are attached to the enclosure 18. The connectors 26, 28 are engaged by mating connectors (not shown) of the portable computer 10. The connectors 26 and 28 may also be integrally formed with each other.

The support members 20 are configured to position the openings 23 adjacent to side portions 25 and a rear portion 27 of the enclosure 18, FIG. 2. By positioning the openings 23 in this configuration, air flow from the openings 23 is directed away from a front portion 29 of the enclosure 18. Reducing air flow directed toward the front portion 29 of the enclosure 18 enhances comfort.

The support members 20 are attached to the enclosure 18 adjacent to an orifice plate 30, FIG. 2. A plurality of orifices 32 extend through the orifice plate 30. The orifice plate 30 may be integrally formed with the enclosure 18, as shown. In another embodiment, a discrete orifice plate may be separately formed and attached to the enclosure 18 using fasteners, adhesive or other fastening techniques. The enclosure 18, the orifice plate 32 and an air duct 34 discussed below may be formed from a polymeric material such as Polycarbonate, Acrylonitrile Butadiene Styrene (commonly known as ABS) or a combination thereof using a process such as injection molding.

The air duct 34, FIGS. 3 and 4, is attached to an interior portion of the enclosure 18. An outlet portion 36 of the air duct 34 is positioned adjacent to the orifice plate 30. An inlet portion 38, FIG. 4, of the air duct 34 is attached to a blower 40. The blower 40 includes a housing 40a, an electric motor 40b and a fan 40c. The blower 40 is positioned adjacent to an opening 42 formed in a wall of the enclosure 18. A sealing member 43 such as a gasket or an O-ring may be positioned between the blower 40 and a wall of the enclosure 18 and between the blower 40 and the air duct 34 to limit air leaks.

Referring to FIG. 4, the blower 40 may be operated to pressurize the air duct 34, causing air to be expelled from the orifices 32. One or more baffles 44 may be attached to an interior surface 46 of the air duct 34. The baffles 44 are configured to create a non-uniform pressure distribution within the air duct 34. A low pressure zone 48 and a high pressure zone 50 are established in the air duct 34 by the flow of air through and around the baffles 44. For a uniform pattern of orifices 32 adjacent to each one of the pressure zone 48, 50, the volumetric air flow through each one of the orifices 32 at the high pressure zone 50 will be greater than the volumetric air flow through each one of the orifices 32 adjacent to the low pressure zone 48. By tailoring the configuration of the baffles 44, non-uniform air flow through uniformly spaced and sized orifices 32 can be achieved.

Figure 5A:
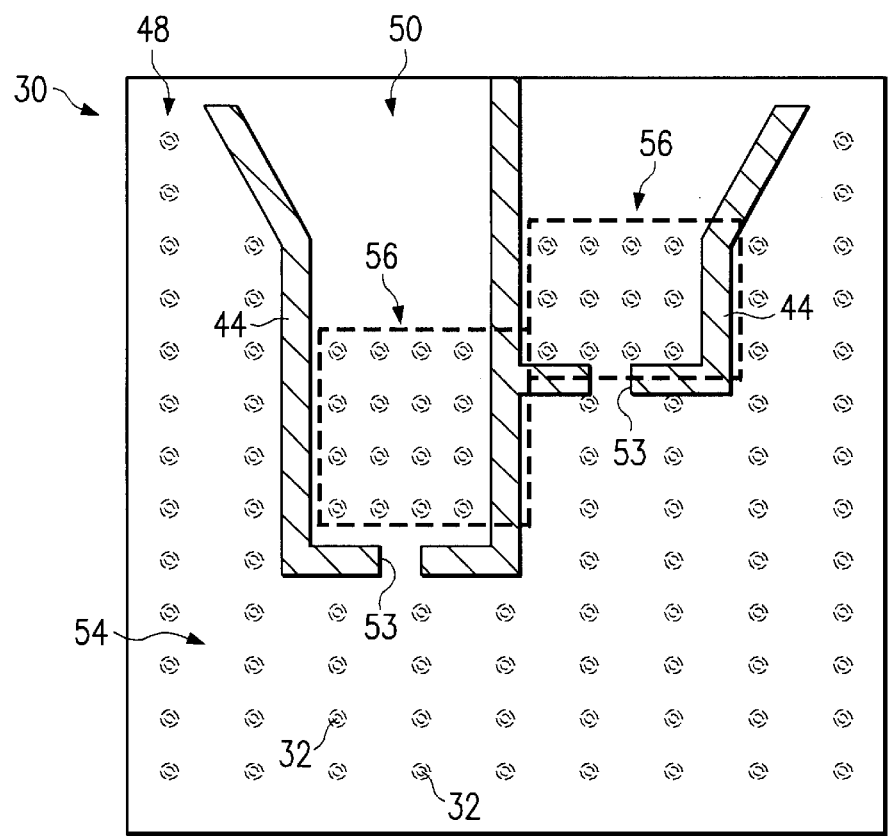
FIG. 5a is a fragmentary bottom view illustrating an embodiment of an orifice plate.

FIG. 5a illustrates an embodiment of an orifice plate 30 that is formed separate from the enclosure 18. The orifice plate 30 may be formed from a sheet of plastic or metal. The orifice plate 30 includes one or more baffles 44. The baffles 44 may be integrally formed with the orifice plate 30 or the baffles 44 may be formed separately and attached to the orifice plate 30 using fasteners, adhesive or other types of fastening techniques. The baffles 44 include an opening 53 such that the pressure within the high pressure zone 50 is maintained at a desired level.

Still referring to FIG. 5a, the orifice plate 30 includes a low orifice density region 54 that has fewer orifices 32 per unit area than does a high orifice density region 56 for the same unit area. For orifices of the same size and shape, more air will flow through the orifice plate 30 at the high density region 56 than at the low density region 54, even when no baffles 44 are present. The addition of baffles 44 for creating high pressure 40 adjacent to the high orifice density region 56 will further enhance air flow at the high orifice density region 56.

Figure 5B:
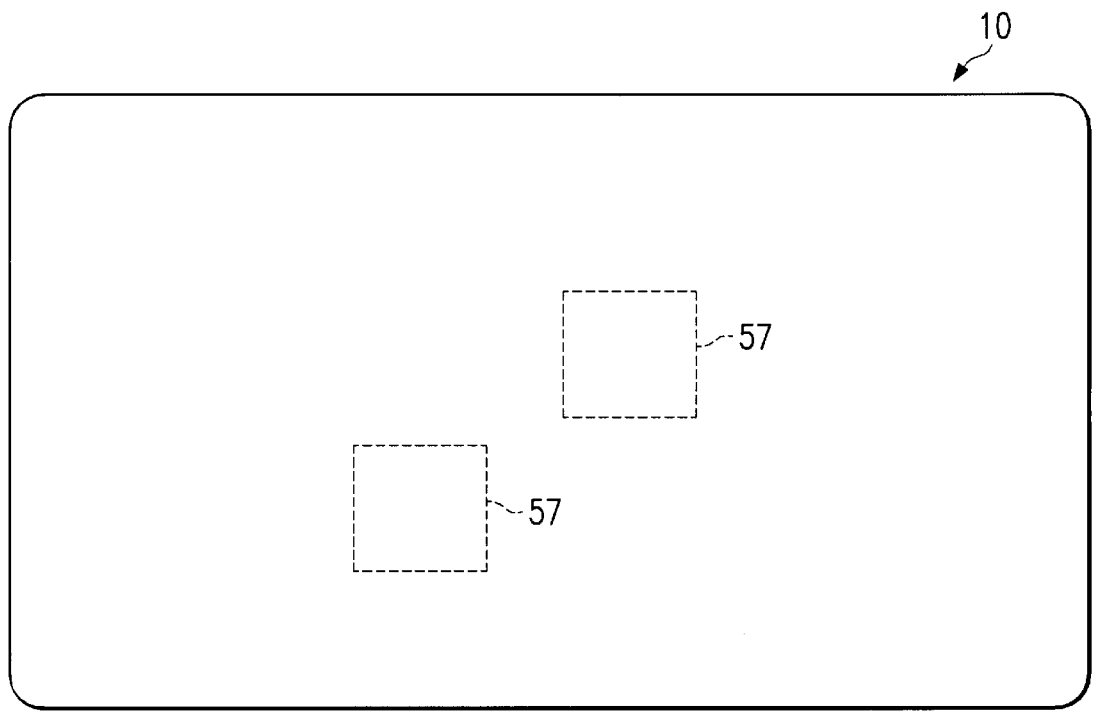
FIG. 5b is a bottom view illustrating an embodiment of the portable computer.

The high density orifice region 56, FIG. 5a, is shaped and positioned to align with one or more heat generating components 57, FIG. 5b, such as memory, a microprocessor, video controller or other high power consumption component when the portable computer 10 is seated on docking apparatus 12. By providing additional air flow to the portions of the base 14 of the portable computer 10 adjacent to the heat generating components, the cooling of specific heat generating components can be optimized such that performance and reliability of the portable computer 10 are enhanced.

FIGS. 6 and 7 illustrate an embodiment of an orifice 132 in an orifice plate 130. The orifice 132 has a non-circular cross-sectional profile, FIG. 6. The orifice 132 has an inlet region 158, an outlet region 160 and an orifice wall 162, FIG. 7, extending between the inlet and outlet regions 158, 160. The inlet region 158 has a larger cross sectional area than the outlet region 160. The orifice wall 162 has a contoured profile.

FIGS. 8 and 9 illustrate an embodiment of an orifice 232 in an orifice plate 230. The orifice 232 has a circular cross-sectional profile, FIG. 8. The orifice has an inlet region 258, an outlet region 260 and an orifice wall 262, FIG. 9, extending between the inlet and outlet regions 258, 260. The inlet region 258 has a larger cross sectional area than the outlet region 260. The orifice wall 262 has a straight tapered profile.

Figure 10:
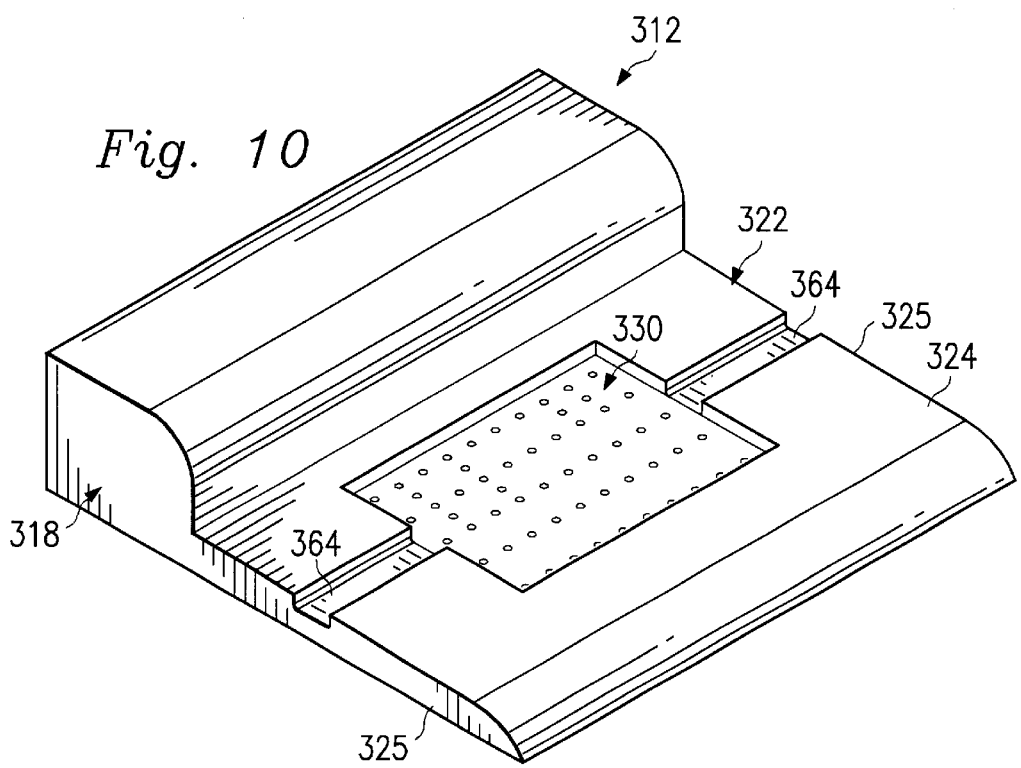
FIG. 10 is a perspective view illustrating another embodiment of a docking station.

An alternate embodiment of a docking apparatus 312 having an orifice plate 330 is illustrated in FIG. 10. The orifice plate 330 is recessed with respect to the top surface 322 of the enclosure 318. The top surface 322 includes the support surface 324 that supports the portable computer. A plurality of channels 364 extend from the orifice plate 330 to a respective one of the side portions 325 of the enclosure 318 for enabling air to be exhausted from the orifice region 330.

Figure 11:
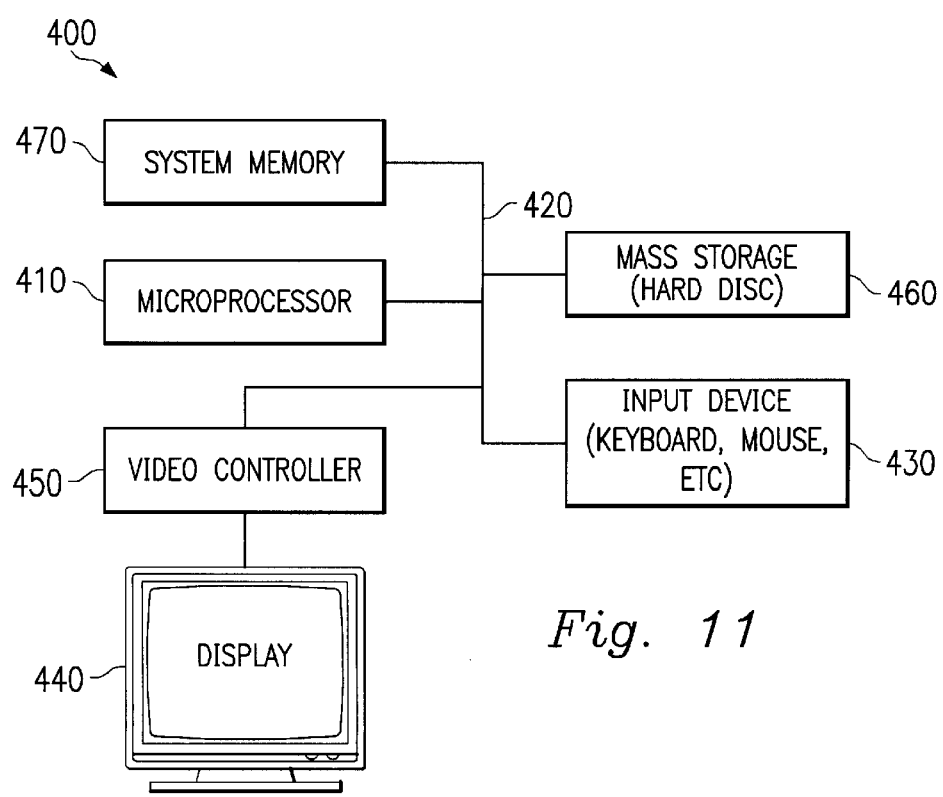
FIG. 11 is a block diagram illustrating an embodiment of a computer system.

An embodiment of a computer system 400 is illustrated in FIG. 11. The computer system 400 includes at least one microprocessor 410. The microprocessor 410 is connected to a bus 420. The bus 420 serves as a connection between the microprocessor 410 and other components of the computer system 400. One or more input devices 430 may be coupled to the microprocessor 410 to provide input to the microprocessor 410. Examples of input devices include keyboards, touchscreens, and pointing devices such as a mouse, a trackball and a trackpad. The computer system 400 may also include a display 440 which is coupled to the microprocessor 410 typically by a video controller 450. Programs and data are stored on a mass storage device 460 which is coupled to the microprocessor 410. Mass storage devices include components such as hard disks, optical disks, magneto-optical drives, floppy drives, and the like. A system memory 470 provides the microprocessor 410 with fast storage to facilitate execution of computer programs by the microprocessor 410. It should be understood that other busses and intermediate circuits can be employed between the components described above and microprocessor 410 to facilitate interconnection between the components and the microprocessor 410.

EXAMPLE

A test apparatus was fabricated to identify estimated temperature reductions associated with a cooling apparatus according to the present disclosure. A hole having a diameter of approximately 3.50 inches was formed through a plate of aluminum having a thickness of approximately 0.25 inches. A fan was mounted adjacent to the hole on a first side of the plate. The fan provided approximately 5.0 CFM at 0.3 inwg backpressure. A commercially-available fan providing approximately the same flow characteristics is a Nidec Series TA350DC, model 33416-16 fan. An orifice plate was attached to a second side of the plate over the hole. The orifice plate was formed from a sheet of metal having a thickness of approximately 0.25 mm. The orifice plate was perforated with round holes that have a diameter of approximately 4.0 mm. The center-to-center distance of adjacent holes was approximately 8.0 mm. A Dell™ Latitude™ model portable computer was supported on

TABLE 1

| Temperature Sensor Location | Approximate Steady State Temperature (deg. F.) | | Temperature Reduction |
|---|---|---|---|
| | Fan Off | Fan On | deg. F. |
| Metal Memory Door | 117 | 82 | 34 |
| Memory Chip | 138 | 115 | 23 |
| Skin Temp (adjacent HDD) | 102 | 86 | 16 |
| Video Controller | 147 | 133 | 14 |
| Skin Temp (adjacent CDROM) | 95 | 82 | 13 |
| Audio Controller | 149 | 138 | 11 | support members above the plate, with the bottom surface of the computer approximately 11.5 mm the above the plate. The temperature of various portions and components of the portable computer were measured to determine temperature reductions associated with operating the fan relative to the fan not being operated. The results are provided in Table 1.

One embodiment provides a cooling apparatus for a computer docking device including an orifice plate connected to the docking device and having a plurality of orifices formed therethrough. The apparatus is provided with a support for supporting a portable computer at an offset distance with respect to a first side of the orifice plate. An air duct including an inlet portion and an outlet portion is positioned adjacent to a second side of the orifice plate. A blower is attached to the inlet portion of the air duct with the blower being operable to pressurize the air duct such that air is expelled from the outlet portion of the air duct through the orifices.

Another embodiment provides a docking device for a portable computer including an enclosure including a support surface for supporting a portable computer thereon. An orifice plate is attached to the enclosure adjacent to the support surface. The orifice plate includes a plurality of orifices formed therethrough and the orifice plate is recessed with respect to the support surface. An air duct including an inlet portion and an outlet portion is attached to an interior portion of the enclosure adjacent to the orifice plate. A blower is attached to the inlet portion of the air duct. The blower is operable to pressurize the air duct such that air is expelled through the orifices.

Yet another embodiment provides a computer including a microprocessor, an input coupled to provide input to the microprocessor, a mass storage coupled to the microprocessor and memory coupled to the microprocessor to provide storage to facilitate execution of computer programs by the microprocessor. The computer is supported by an enclosure. An orifice plate is attached to the enclosure adjacent to the computer. The orifice plate includes a plurality of orifices formed therethrough. The orifice plate is spaced apart from the computer by an offset distance. An air duct including an inlet portion and an outlet portion is attached to an interior surface of the enclosure adjacent to the orifice plate. A blower is attached to the inlet portion of the air duct. The blower is operable to pressurize the air duct such that air is expelled through the orifices.

A further embodiment provides a method of cooling a portable computer mounted on a docking device. The method includes the steps of forming a plurality of orifices through an orifice plate of the docking apparatus, supporting a portable computer at an offset distance with respect to a first side of the orifice plate, positioning an outlet portion of an air duct adjacent to a second side of the orifice plate and attaching a blower to an inlet portion of the air duct. In response to operating the blower to pressurize the air duct, air from the outlet portion of the air duct is expelled through the orifices.

As it can be seen, the embodiments presented herein provide several advantages. By impinging air against a surface of the computer to create turbulent air flow, the laminar boundary layer thickness at the surface of the computer is reduced. The reduced boundary layer thickness results in the skin temperature of the computer enclosure and the operating temperature of heat generating internal components being significantly reduced. The air can be directed to specific areas of the computer enclosure. The processor can be operated at higher speeds for longer periods of time. The comfort associated with using the computer is enhanced. The apparatus provides uniform cooling over the entire adjacent surface of the computer.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cooling apparatus for a computer docking device, comprising:
   a docking device;
   an orifice plate connected to the docking device including a plurality of orifices formed therethrough;
   a support for supporting a portable computer at an offset distance with respect to a first side of the orifice plate;
   an air duct including an inlet portion and an outlet portion positioned adjacent to a second side of the orifice plate;
   a blower attached to the inlet portion of the air duct, the blower being operable to pressurize the air duct such that air is expelled from the outlet portion of the air duct through the orifices; and
   wherein the orifice plate includes a plurality of orifice regions, a first orifice region having a different orifice density than a second orifice region.

2. A cooling apparatus for a computer docking device, comprising:
   a docking device;
   an orifice plate connected to the docking device including a plurality of orifices formed therethrough;
   a support for supporting a portable computer at an offset distance with respect to a first side of the orifice plate;
   an air duct including an inlet portion and an outlet portion positioned adjacent to a second side of the orifice plate;
   a blower attached to the inlet portion of the air duct, the blower being operable to pressurize the air duct such that air is expelled from the outlet portion of the air duct through the orifices; and
   wherein the orifice plate includes a plurality of orifice regions, a first orifice region having a different orifice area than the orifices of a second orifice region.

3. The cooling apparatus of claim 2 further comprising an enclosure, the orifice plate, air duct and blower being attached to the enclosure.

4. The cooling apparatus of claim 3 wherein the orifice plate and the enclosure are integrally formed.

5. The cooling apparatus of claim 3 wherein the support includes a plurality of support members attached to the enclosure.

6. The cooling apparatus of claim 5 wherein the support members extend above a top portion of the enclosure by an offset distance.

7. The cooling apparatus of claim 5 further comprising a plurality of openings between the support members.

8. A cooling apparatus for a computer docking device, comprising:
   a docking device;
   an orifice plate connected to the docking device including a plurality of orifices formed therethrough;
   a support for supporting a portable computer at an offset distance with respect to a first side of the orifice plate;
   an air duct including an inlet portion and an outlet portion positioned adjacent to a second side of the orifice plate;
   a blower attached to the inlet portion of the air duct, the blower being operable to pressurize the air duct such that air is expelled from the outlet portion of the air duct through the orifices;
   an enclosure, the orifice plate, air duct and blower being attached to the enclosure;
   wherein the support includes a plurality of support members attached to the enclosure;
   a plurality of openings between the support members; and
   wherein the enclosure includes a rear portion and side portions, the openings being positioned adjacent to a respective rear and side portion of the enclosure.

9. The cooling apparatus of claim 8 wherein a first portion of the openings has a first width and a second portion of the openings has a second width.

10. The cooling apparatus of claim 9 wherein the first portion of openings is adjacent to a first orifice region of the orifice plate and the second portion of openings is adjacent to a second orifice region of the orifice plate.

11. The cooling apparatus of claim 2 further comprising a sealing member disposed between the blower and the air duct.

12. A cooling apparatus for a computer docking device, comprising:
    a docking device;
    an orifice plate connected to the docking device including a plurality of orifices formed therethrough;
    a support for supporting a portable computer at an offset distance with respect to a first side of the orifice plate;
    an air duct including an inlet portion and an outlet portion positioned adjacent to a second side of the orifice plate;
    a blower attached to the inlet portion of the air duct, the blower being operable to pressurize the air duct such that air is expelled from the outlet portion of the air duct through the orifices; and
    wherein each one of the orifices has an inlet and outlet, the outlet having a smaller cross sectional area than the inlet.

13. A cooling apparatus for a computer docking device, comprising:
    a docking device:
    an orifice plate connected to the docking device including a plurality of orifices formed therethrough;
    a support for supporting a portable computer at an offset distance with respect to a first side of the orifice plate;
    an air duct including an inlet portion and an outlet portion positioned adjacent to a second side of the orifice plate;
    a blower attached to the inlet portion of the air duct, the blower being operable to pressurize the air duct such that air is expelled from the outlet portion of the air duct through the orifices: and
    wherein each one of the orifices has an inlet and outlet, the outlet having a non-circular cross sectional profile.

14. A cooling apparatus for a computer docking device, comprising:
    a docking device;
    an orifice plate connected to the docking device including a plurality of orifices formed therethrough;
    a support for supporting a portable computer at an offset distance with respect to a first side of the orifice plate;
    an air duct including an inlet portion and an outlet portion positioned adjacent to a second side of the orifice plate;
    a blower attached to the inlet portion of the air duct, the blower being operable to pressurize the air duct such that air is expelled from the outlet portion of the air duct through the orifices; and
    wherein each one of the orifices has an inlet, an outlet and an orifice wall extending between the inlet and the outlet, the orifice wall having a contoured cross sectional profile.

15. A docking device for a portable computer, comprising:

an enclosure including a support surface for supporting a portable computer thereon;

an orifice plate attached to the enclosure adjacent to the support surface, the orifice plate including a plurality of orifices formed therethrough and being recessed with respect to the support surface;

an air duct including an inlet portion and an outlet portion attached to an interior portion of the enclosure adjacent to the orifice plate;

a blower attached to the inlet portion of the air duct, the blower being operable to pressurize the air duct such that air is expelled through the orifices; and wherein the orifice plate includes a plurality of orifice regions, a first orifice region having orifices of a different orifice area than the orifices of a second orifice region.

16. A computer system, comprising;

an enclosure;

a computer including a microprocessor, an input coupled to provide input to the microprocessor, a mass storage coupled to the microprocessor and memory coupled to the microprocessor to provide storage to facilitate execution of computer programs by the microprocessor, the computer being supported by the enclosure;

an orifice plate attached to the enclosure adjacent to the computer, the orifice plate including a plurality of orifices formed therethrough and being spaced apart from the computer by an offset distance;

an air duct including an inlet portion and an outlet portion attached to an interior surface of the enclosure adjacent to the orifice plate;

a blower attached to the inlet portion of the air duct, the blower being operable to pressurize the air duct such that air is expelled through the orifices; and wherein the orifice plate includes a plurality of orifice regions, a first orifice region having an orifice density greater than a second orifice region, the orifices of the first orifice region being directed at a heat generating region of the computer.

17. A computer system, comprising;

an enclosure;

a computer including a microprocessor, an input coupled to provide input to the microprocessor, a mass storage coupled to the microprocessor and memory coupled to the microprocessor to provide storage to facilitate execution of computer programs by the microprocessor, the computer being supported by the enclosure;

an orifice plate attached to the enclosure adjacent to the computer, the orifice plate including a plurality of orifices formed therethrough and being spaced apart from the computer by an offset distance;

an air duct including an inlet portion and an outlet portion attached to an interior surface of the enclosure adjacent to the orifice plate;

a blower attached to the inlet portion of the air duct, the blower being operable to pressurize the air duct such that air is expelled through the orifices; and wherein the orifice plate includes a plurality of orifice regions, a first orifice region having a total orifice area greater than a second orifice region, the orifices of the first orifice region being directed at a heat generating region of the computer.

18. The computer system of claim 16 wherein the air duct and the enclosure are integrally formed.

19. The computer system of claim 16 wherein the orifice plate and the enclosure are integrally formed.

20. The computer system of claim 18 further comprising a plurality of support members attached to the enclosure, the computer being supported on the support members.

21. The computer system of claim 20 wherein the support members extend above a top portion of the enclosure by the offset distance.

22. The computer system of claim 20 further comprising a plurality of openings between the support members.

23. The computer system of claim 22 wherein the enclosure includes a rear portion and side portions of the enclosure, the openings being positioned adjacent to the rear and side portion of the enclosure.

24. The computer system of claim 23 wherein a first portion of the openings have a first width and a second portion have a second width.

25. The computer system of claim 24 wherein the first portion of openings is adjacent to a first orifice region of the orifice plate and the second portion of openings is adjacent to a second orifice region of the orifice plate.

26. The computer system of claim 18 further comprising a sealing member disposed between the blower and the air duct.

* * * * *